United States Patent
Gierth et al.

(10) Patent No.: US 8,069,778 B2
(45) Date of Patent: Dec. 6, 2011

(54) MILK FOAMING DEVICE

(75) Inventors: Rolf Gierth, Burgau (DE); Joachim Höhne, Burgau (DE)

(73) Assignee: PAV Patentverwertung KG, Freilassing (DE)

( * ) Notice: Subject to any disclaimer, the term of this patent is extended or adjusted under 35 U.S.C. 154(b) by 696 days.

(21) Appl. No.: 11/812,713

(22) Filed: Jun. 21, 2007

(65) Prior Publication Data
US 2007/0295226 A1    Dec. 27, 2007

(30) Foreign Application Priority Data
Jun. 22, 2006    (DE) .................... 20 2006 009 786 U

(51) Int. Cl.
*A01J 11/04*    (2006.01)
*A47J 31/44*    (2006.01)

(52) U.S. Cl. .......... 99/452; 99/275; 99/323.1; 99/323.3; 366/165.2

(58) Field of Classification Search .......... 99/293, 99/452–455; 366/101; 239/98
See application file for complete search history.

(56) References Cited

U.S. PATENT DOCUMENTS
| | | | | |
|---|---|---|---|---|
| 4,051,204 A | * | 9/1977 | Muller et al. | 261/36.1 |
| D471,953 S | * | 3/2003 | Colligan et al. | D23/213 |
| 6,681,685 B2 | | 1/2004 | Mahlich | |
| 7,509,907 B2 | * | 3/2009 | Ozanne | 99/293 |

FOREIGN PATENT DOCUMENTS
| | | |
|---|---|---|
| DE | 197 05 633 A1 | 8/1998 |
| DE | 298 17 116 U1 | 2/1999 |
| DE | 202 04 085 U1 | 6/2002 |
| DE | 20 2004 014 737 U1 | 3/2006 |
| EP | 0 858 757 A1 | 8/1998 |
| EP | 1 250 875 A1 | 10/2002 |
| EP | 1 115 317 B1 | 7/2003 |
| EP | 1344477 B1 | 8/2005 |
| EP | 1639925 A | 3/2006 |
| EP | 1639925 A2 * | 3/2006 |

* cited by examiner

*Primary Examiner* — Henry Yuen
*Assistant Examiner* — Jianying Atkisson
(74) *Attorney, Agent, or Firm* — Baker & Hostetler LLP

(57) ABSTRACT

The invention relates to a milk foaming device with a mixing chamber, which is arranged downstream of a steam supply pipe and which is connected to a milk and/or milk/air supply pipe, and a discharge device for the mixture arranged downstream of the mixing chamber, which has a number of discharge channels. The emitted milk foam flow is to be improved. To achieve this the discharge openings of the discharge channels are sloped at an angle to the cross-sectional plane of the discharge channel and the slope angles of the discharge openings of the discharge channels have the same vertex.

6 Claims, 3 Drawing Sheets

MILK FOAMING DEVICE

CROSS-REFERENCE TO RELATED APPLICATIONS

This application claims priority of German Patent Application No. 202006009786.4, filed Jun. 22, 2006, the disclosure of which is hereby incorporated by reference in its entirety.

FIELD OF THE INVENTION

The invention relates to a milk foaming device with a mixing chamber, which is arranged downstream of a steam supply pipe and which is connected to a milk and/or milk/air supply pipe, and a discharge device for the mixture arranged downstream of the milk chamber, which has a number of discharge channels.

BACKGROUND OF THE INVENTION

A device of this nature is, for example, known from DE 20204085 U1. Here, the milk/air mixture is passed into the milk chamber where it is mixed with steam. Directly following the mixing chamber is a settling section consisting of a number of settling channels in parallel to the flow, each of which forms a discharge opening on an open end for the discharge of a milk foam flow to the outside. According to the associated EP 1344477 B1 the clearance diameter of the cross-section of each of these settling channels should be dimensioned in a ratio to its length which is 1 to at least 10 overall divided by the number of settling channels. Due to very long settling channels which are relatively small in cross-section, the steam/air/milk mixture flows as evenly as possible from the device and no splashes arise. The disadvantage is however that the channels are relatively small in cross-section, but relatively long, resulting in the requirement for continual cleaning. Otherwise the channels become very quickly blocked with clinging milk protein. Moreover, the relatively long settling section also leads to the forming of a relatively long foaming device.

Further measures for settling the steam/air/milk mixture discharged from the mixing chamber are described in EP 0858757 B1 and in EP 1115317 B1.

SUMMARY OF THE INVENTION

The object of the invention is to improve a milk foaming device of the type mentioned in the introduction such that an even and directed milk foam flow is discharged through simple measures.

The object is solved according to the invention in that the discharge opening of a discharge channel slopes at an angle to the cross-sectional plane of the discharge channel. The foam mixture flowing through the discharge channel separates earlier from the channel wall during discharge at some points of the discharge channel than at other points, by means of which a predetermined deviation during discharge can be imposed on the flow jet. This means also that at least one section of a discharge channel terminates above at least one other section of the same discharge channel. Due to specific flow deviation the partial flows flowing through the discharge channels can be, for example, specifically brought together so that an even, splash-free total jet is produced. On the other hand, also overall widening of the jet can take place or a twist can be imposed on the jet. The slope angle should preferably be between >0 and <90°, preferably between 30 and 50°.

According to one embodiment the discharge openings of the discharge channels slope at the same angle to the cross-sectional plane of the discharge channel. This both simplifies manufacture and provides all discharge channels with the same type of deviation which leads to a defined overall jet.

It is in particular advantageous if the slope angles of the discharge openings of the discharge channels have the same vertex. In this way combining of the partial flows along a common axis of flow through the vertex is realised. The wall areas of the discharge channels, which are positioned closest to the axis of flow, are brought further down than the wall areas lying opposite, so that the partial flows further outwards separate faster on the channel wall than on the wall section positioned closer to the axis of flow.

A particularly favourable embodiment provides for the discharge device having an at least regionally truncated conical or spherical end area and the discharge channels for forming the discharge opening intersect the conical or spherical section of the end area. The discharge channels are in this way so to say diagonally cut off, so that the required shape of the discharge openings results. A conical or spherical shape can be produced very simply and reinforces the combination of the partial flows to one overall flow.

In order to again reinforce the foaming effect in addition to the mixing chamber, a foaming chamber with a baffle arranged transverse to the flow direction can be provided downstream of the mixing chamber. This means that the mixture flowing out of the mixing chamber, in particular in jet form, is sprayed against a baffle and reinforced foaming of the mixture occurs in the foaming chamber to which the baffle is assigned. The steam/air/milk foam is consequently particularly creamy.

In order that the creamy foam can arrive at its destination as unimpaired as possible, in a further variant the inlet openings of the discharge channels are arranged in the baffle. Preferably a grouping of the inlet opening of the discharge channels around the actual baffle point takes place.

It is favourable if a nozzle channel is located between the mixing chamber and the foaming chamber. This nozzle channel ensures that the milk foam is emitted as a jet at a relatively high speed from the nozzle channel and impinges on the baffle.

The foaming in the foaming chamber is reinforced still further in that according to a further embodiment, the nozzle channel is reduced in cross-section at least sectionally in the direction of flow. In this way the foam jet takes on more speed and the momentum for impinging on the baffle is reinforced.

For constructive simplification the discharge device can comprise a plug-on sleeve, which is plugged onto a plug-on connection piece arranged downstream of the mixing chamber, which borders the foaming chamber to the side and which has the baffle with the discharge channels at the lower end. In this way the lower part can be very easily removed and cleaned, because immediate access to the foaming chamber is provided. Furthermore, a plug-on sleeve of this nature can be inexpensively produced, in particular using injection moulding techniques.

Preferably the nozzle channel can be arranged in the plug-on connection piece. Automatic centering is provided due to this arrangement. Furthermore, the plug-on connection piece makes two functions available. One is an adequate length for forming the nozzle channel and the other is an adequate length for plugging on the plug-on sleeve.

According to one variant, very good foaming results are achieved when a distance between the outlet of the nozzle channel and the baffle corresponds to 2.5 to 5 times the diameter of the outlet of the nozzle channel.

BRIEF DESCRIPTION OF THE DRAWINGS

In the following an embodiment of the present invention is explained in more detail based on a drawing. The following are shown.

DETAILED DESCRIPTION OF THE INVENTION

Figure 3:
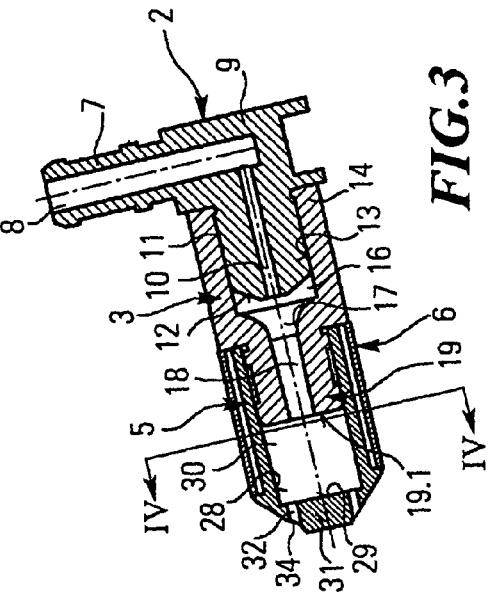
Figure 4:
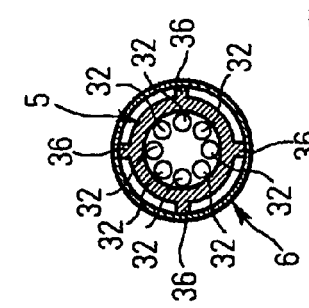
Figure 1:
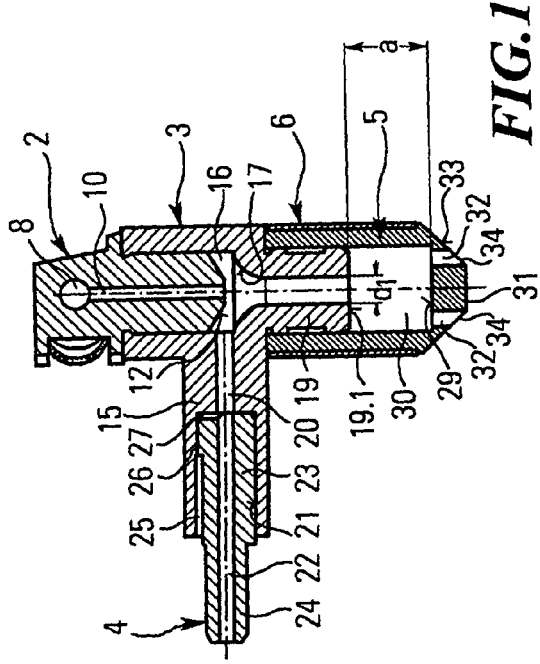
FIG. 1 a fully sectioned milk foaming device,
FIG. 2 the milk foaming device of FIG. 1 in a plan view,
FIG. 3 the milk foaming device sectioned along the line III-III of FIG. 2,
FIG. 4 a sectional illustration sectioned along the line IV-IV of FIG. 3,
FIG. 5 a plug-on sleeve in an enlarged front view,
FIG. 6 the plug-on sleeve of FIG. 5 fully sectioned,
FIG. 7 a bottom view of the plug-on sleeve from FIG. 5 and
FIG. 8 a perspective illustration of the hose connection of FIG. 1 in an enlarged illustration.
Figure 2:
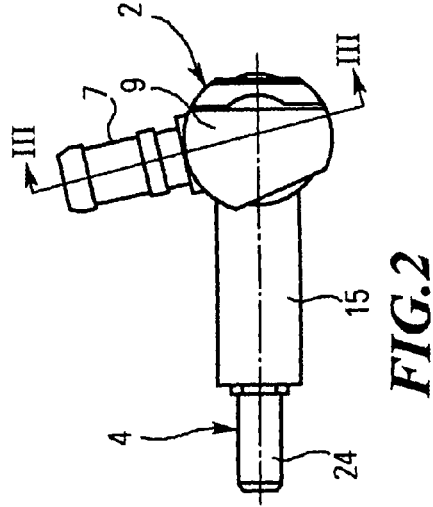

The milk foaming device 1 illustrated in FIGS. 1 to 4 in the assembled state comprises essentially five mutually separable components. These five components are the steam supply pipe 2, mixing chamber part 3, milk hose adapter 4, plug-on sleeve 5 and the protective sleeve 6.

The steam supply pipe 2 has an insertion section 7, with which the steam supply pipe 2 is inserted in a sealing manner into the steam outlet of a coffee machine (not illustrated). The insertion section 7 has a steam supply pipe hole 8 extending longitudinally through it, which terminates in a central part 9 and from which a mixing chamber supply pipe 10, smaller in cross-section, branches at right angles. The mixing chamber supply pipe 10 extends through an insertion piece 11, which extends away from the central part 9 at right angles to the insertion section 7. The face side 12 of the insertion piece 11 is formed as a truncated cone and the mixing chamber supply pipe 10 terminates at its centre. The steam supply pipe 2 is manufactured from a strong plastic which can withstand the heat of the incoming steam.

The insertion piece 11 is inserted in a sealing manner into a cylindrical mixing chamber hole 13 of the mixing chamber part 3. The mixing chamber hole 13 is arranged in a sleeve section 14 of the mixing chamber part 3, from where an insertion piece 15 leads away at right angles for the accommodation of the milk hose adapter 4. Below the insertion piece 11 in the sleeve section 14 the mixing chamber 16 is formed, the bottom 17 of which is formed in a hopper shape and then transfers to a further narrowing nozzle channel 18. The nozzle channel 18 is located in an insertion section 19 which is inserted in a sealing manner into the plug-on sleeve 5. The insertion piece 15 has a supply line channel 20 which opens into the mixing chamber 16 at approximately the height of the discharge opening of the mixing chamber supply pipe 10. The flow cross-section of the supply line channel 20 is somewhat larger than that of the mixing chamber supply pipe 10. At the end of the insertion piece 15 there is an insertion hole 21 for the milk hose adapter 4. The mixing chamber part 3 consists of an elastic material, e.g. a silicone.

Figure 8:
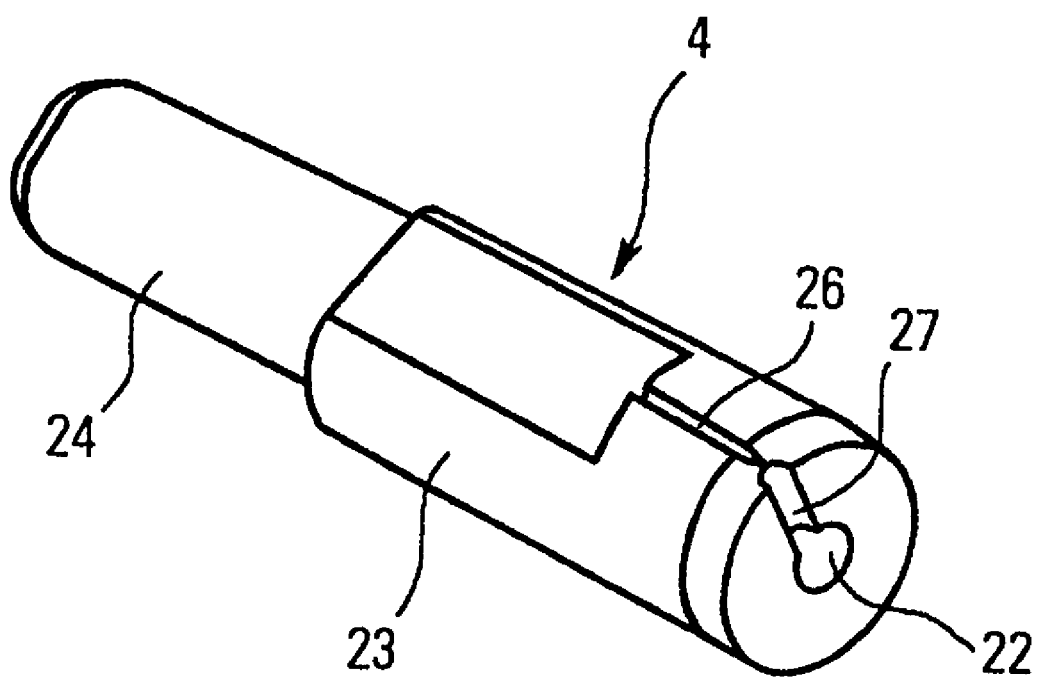

The milk hose adapter 4 will now be explained in more detail with the aid of FIG. 8. The milk hose adapter 4 has a milk pipe 22 which extends centrally through it and which is aligned to the supply line channel 20. The front larger cylindrical section 23 is inserted into the insertion hole 21 of the insertion piece 15 so that the face side of the milk hose adapter 4 lies level on the bottom of the insertion hole 21. A cylindrical piece 24, which is smaller in cross-section, is used for plugging on a milk supply line hose (not illustrated). The cylindrical section 23 is flattened on one side so that a cavity 25 is created between the cylindrical section 23 and the insertion hole 21. A small air channel 26, which transfers into a connecting channel 27 on the face side, is connected to this cavity 25. The connecting channel 27 connects the air channel 26 to the milk pipe and the supply line channel 20. The milk hose adapter 4 consists of strong plastic.

Figure 7:
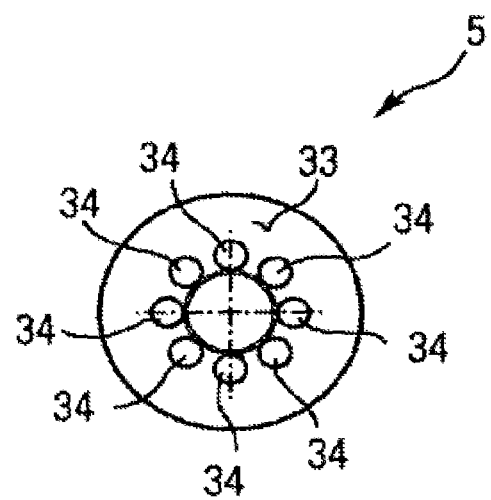
Figure 6:
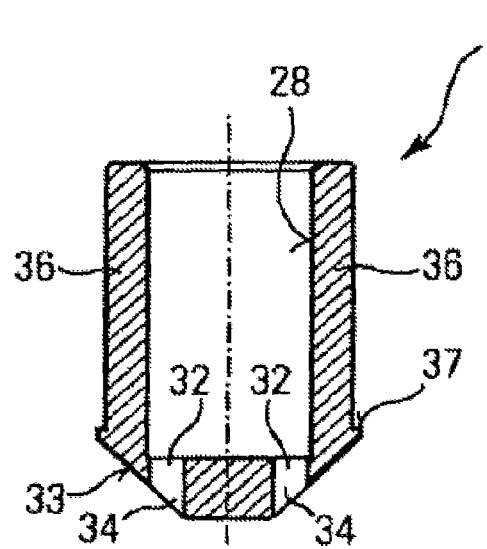
Figure 5:
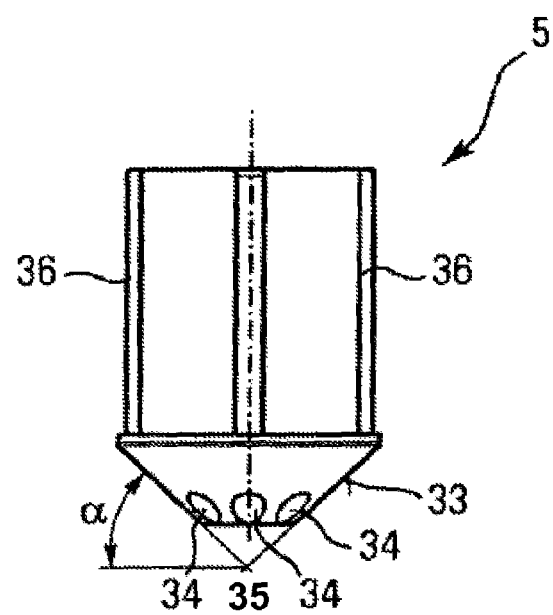

The plug-on sleeve 5 is pushed onto the insertion section 19 by means of a sleeve hole 28 (refer also to FIGS. 5 to 7). A foaming chamber 30 is formed between the face side 19.1 of the insertion section 19 and a bottom area 29 of the sleeve hole 28. The bottom area 29 is formed by a baffle 31. The central part of the baffle 31 is closed, whereas at its marginal region a number of evenly distributed discharge channels 32 are arranged (eight in this case). The discharge channels 32 all extend parallel to one another and parallel to the axis of the plug-on sleeve 5. The face area 33 of the plug-on sleeve 5 is formed as a truncated cone, wherein the discharge channels 32 terminate in the surface shell of the truncated cone and thus have discharge openings 34 sloped at an angle $\alpha$. In this way the discharge openings 34 take on an approximately elliptical shape in the side view (refer to FIG. 5). This means also that on one side, which is closer to the axis of the plug-on sleeve 5, the wall of the discharge channels 32 is longer than on the side located opposite. Due to the fact that the truncated cone is evenly formed, all discharge openings 34 have the same slope angle $\alpha$ and a common vertex 35. The slope angle $\alpha$ in this case is approximately 45° (preferably 30-60°). The distance a between the face side 19.1 of the insertion section 19 and the bottom area 29 is in this case 3.4 times the diameter $d_1$ of the discharge opening of the nozzle channel 18 (preferably the distance a is 2.5 to 5 times the diameter $d_1$).

On the surface shell of the plug-on sleeve 5 four ribs 36 are arranged onto which the protective sleeve 6 consisting of stainless steel is plugged and held by a circumferential collar 37. The plug-on sleeve 5 consists of a strong plastic. The ribs 36 minimise the heat transmission from the plug-on sleeve 5 to the protective sleeve 6 to simplify assembly. The steam supply pipe 2, milk hose adapter 4 and plug-on sleeve 5 can be manufactured from, for example, PPGF-20, whereas the mixing chamber part 3 can consist of Silicone 70 Shore A.

In the following the principle and function of the present invention will be explained in more detail based on the embodiment described above.

Steam is supplied through the steam supply pipe 2 so that it flows through the mixing chamber supply pipe 10 into the mixing chamber 16. A negative pressure arises due to the Venturi effect so that milk is now drawn through the milk pipe 22 and the supply line channel 20. At the same time air is added via the cavity 25, air channel 26 and the connecting channel 27 to the milk so that an air/milk mixture is present in the supply line channel 20 and it flows into the mixing chamber 16. In the mixing chamber 16 the air/milk mixture mixes with the steam. The steam/milk/air mixture then leaves the mixing chamber 16 through the nozzle channel 18 in which it is accelerated and is sprayed into the foaming chamber 30. This means that the steam/milk/air mixture enters this foaming chamber 30 as a jet which is directed against the baffle 31. Through impinging on the baffle 31 intensive foaming is produced so that a very creamy foam of milk can flow out through the discharge channels 32.

Due to the sloping discharge openings and thus also the diagonally running discharge edge, the milk foam flowing out through the discharge channels 32 on one side of the discharge channels 32 clings longer to the wall than to the oppositely located side. In the outer lying regions of the baffle 31 the milk foam thus separates earlier on the discharge channels 32 than further inwards. In this way the partial jets of milk foam, which are emitted from the discharge channels 32, are subjected to a certain deviation towards the axis of the plug-on sleeve 5. This effect is further reinforced by the conical form of the face side 33. Although the discharge channels 32 are relatively short, their form enables the partial jets to be combined to form a common flow of foamed milk centrally on the face side 33 of the plug-on sleeve 5. The length of the discharge channels 32 is accordingly only approximately ⅙ of the complete distance from the mixing chamber 16 to the face side 33 (preferably less than half or more preferably less than ¼ of this distance). The ratio between the diameter of the discharge channels 32 to their length is approximately 1:2.5 (preferably at the most 1:8 or preferably at the most 1:4).

The milk foam flow formed is emitted evenly from the end of the plug-on sleeve 5 and essentially no splashes are caused.

The invention claimed is:

1. Milk foaming device, comprising:
   a mixing chamber arranged downstream of a steam supply pipe and connected to a milk supply pipe or milk and air supply pipes,
   a foaming chamber, arranged downstream of the mixing chamber, including a baffle arranged transverse to the flow direction, and
   a discharge device for the mixture, arranged downstream of the foaming chamber, including:
      an at least regionally truncated conical or spherical end area and a number of discharge channels with inlet openings that are distributed in the baffle and discharge openings that intersect the conical or spherical end area, and
      a plug-on sleeve, plugged onto a plug-on connection piece arranged downstream of the mixing chamber, which borders the foaming chamber to the side and which has the baffle with the discharge channels at the lower end,
   wherein the discharge openings of the discharge channels are sloped at an angle ($\alpha$) to the cross-sectional plane of the discharge channel, and the slope angles ($\alpha$) of the discharge openings of the discharge channels have the same vertex.

2. Milk foaming device according to claim 1, wherein the discharge openings of the discharge channels are sloped at the same angle ($\alpha$) to the cross-sectional plane of the discharge channel.

3. Milk foaming device according to claim 1, wherein a nozzle channel is arranged between the milk chamber and the foaming chamber.

4. Milk foaming device according to claim 3, wherein the nozzle channel is reduced in cross-section in the direction of flow at least in sections.

5. Milk foaming device according to claim 1, wherein a nozzle channel is arranged in the plug-on connection piece.

6. Milk foaming device according to claim 5, wherein a distance (a) between the outlet of the nozzle channel and the baffle corresponds to 2.5 to 5 times the diameter ($d_1$) of the outlet of the nozzle channel.

* * * * *